(12) United States Patent
Mori

(10) Patent No.: US 9,294,748 B2
(45) Date of Patent: *Mar. 22, 2016

(54) DISPLAY DEVICE, BRIGHTNESS ADJUSTMENT DEVICE, METHOD OF ADJUSTING BRIGHTNESS, AND PROGRAM

(71) Applicant: JOLED INC., Chiyoda-Ku (JP)

(72) Inventor: Hideto Mori, Tokyo (JP)

(73) Assignee: JOLED INC., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,735

(22) Filed: Apr. 16, 2014

(65) Prior Publication Data

US 2014/0307170 A1    Oct. 16, 2014

Related U.S. Application Data

(63) Continuation of application No. 13/131,617, filed as application No. PCT/JP2009/070252 on Dec. 2, 2009, now Pat. No. 8,730,275.

(30) Foreign Application Priority Data

Dec. 11, 2008   (JP) .................. 2008-316291

(51) Int. Cl.
*G09G 5/10* (2006.01)
*G09G 5/00* (2006.01)
(Continued)

(52) U.S. Cl.
CPC .. *H04N 9/68* (2013.01); *G09G 3/20* (2013.01); *G09G 3/3208* (2013.01);
(Continued)

(58) Field of Classification Search
CPC ............ G09G 3/20; G09G 2320/0271; G09G 2320/041; G09G 2320/0613; G09G 2320/062; G09G 2320/0646; G09G 2320/0666; G09G 2330/021; G09G 2360/144; G09G 2360/16; G09G 2360/18; G09G 3/3208; G09G 3/3406; G09G 3/3611; H04N 9/68

USPC ............... 345/77, 87, 590, 169, 63, 690, 102, 345/691; 315/169.1–169.3; 349/40–55
See application file for complete search history.

(56) References Cited

U.S. PATENT DOCUMENTS 7,839,365 B2   11/2010  Knapp et al.
2007/0085785 A1  4/2007  Ozaki et al.
(Continued)

FOREIGN PATENT DOCUMENTS

CN   101272504 A   9/2008
JP   2000-305514 A   11/2000
(Continued)

OTHER PUBLICATIONS

International Search Report issued Mar. 2, 2010 in PCT/JP09/70252 filed Dec. 2, 2009.

(Continued)

*Primary Examiner* — Kent Chang
*Assistant Examiner* — Nelson Rosario
(74) *Attorney, Agent, or Firm* — Oblon, McClelland, Maier & Neustadt, L.L.P.

(57) ABSTRACT

Provided is a display device including a setting condition acquisition unit for obtaining various conditions for adjusting a gain of a video-signal, a current-brightness table calculation unit that calculates a table representing a relationship between an average brightness and a gain of a video-signal, and that calculates the table capable of setting a peak-brightness and power consumption of the video-signal independently, based on the various conditions acquired by the setting condition acquisition unit, a video-average brightness conversion block that calculates average-brightness of the video-signal input for each frame, a current-brightness control table that calculates a gain of the video-signal from the table based on the average-brightness calculated above, a video gain block that adjusts the video-signal using the gain calculated above, and a display panel that includes a plurality of pixels that emit light in response to a video-signal and displays a video based on the video-signal adjusted above.

10 Claims, 7 Drawing Sheets

(51) Int. Cl.
*G09G 3/30* (2006.01)
*H04N 9/68* (2006.01)
*G09G 3/20* (2006.01)
G09G 3/32 (2006.01)
G09G 3/34 (2006.01)
G09G 3/36 (2006.01)

(52) U.S. Cl.
CPC ........... *G09G 3/3406* (2013.01); *G09G 3/3611* (2013.01); *G09G 2320/0271* (2013.01); *G09G 2320/041* (2013.01); *G09G 2320/062* (2013.01); *G09G 2320/0613* (2013.01); *G09G 2320/0646* (2013.01); *G09G 2320/0666* (2013.01); *G09G 2330/021* (2013.01); *G09G 2360/144* (2013.01); *G09G 2360/16* (2013.01); *G09G 2360/18* (2013.01)

(56) References Cited

U.S. PATENT DOCUMENTS

| 2007/0126672 | A1 | 6/2007 | Tada et al. |
| 2007/0274586 | A1 | 11/2007 | Yamano et al. |
| 2008/0117153 | A1 | 5/2008 | Fujine et al. |
| 2008/0284767 | A1 | 11/2008 | Mori et al. |
| 2009/0267876 | A1 | 10/2009 | Kerofsky |
| 2010/0127957 | A1 | 5/2010 | Meguro et al. |
| 2011/0069098 | A1 | 3/2011 | Lee et al. |
| 2011/0205442 | A1 | 8/2011 | Mori et al. |
| 2012/0169700 | A1 | 7/2012 | Mori |

FOREIGN PATENT DOCUMENTS

| JP | 2005 283909 | 10/2005 |
| JP | 2006-030416 A | 2/2006 |
| JP | 2006 163068 | 6/2006 |
| JP | 2006 243435 | 9/2006 |
| JP | 2007 086277 | 4/2007 |
| JP | 2007 147730 | 6/2007 |
| JP | 2007 147868 | 6/2007 |
| JP | 2007 298693 | 11/2007 |
| JP | 2008 026762 | 2/2008 |
| JP | 2008 070496 | 3/2008 |
| JP | 2008 268500 | 11/2008 |
| WO | WO 2008 143130 | 11/2008 |
| WO | WO 2008 146742 | 12/2008 |

OTHER PUBLICATIONS

Chinese Office Action issued Jul. 23, 2013 in Chinese Patent Application No. 200980155265.6 with English translation, 23 pages.
Japanese Office Action issued Jan. 8, 2013 in JP Patent Application No. 2008-316291.
Office Action mailed Oct. 31, 2015 in Korean Patent Application No. 10-2011-7012167 (with English Translation).

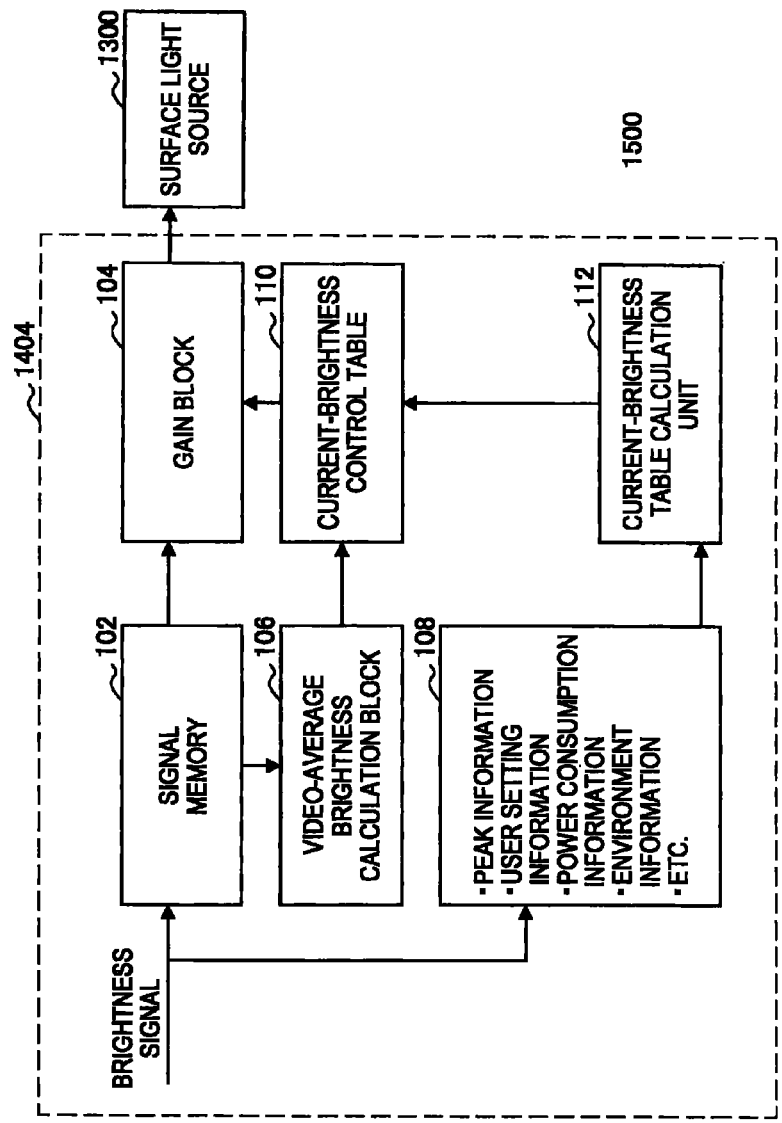

DISPLAY DEVICE, BRIGHTNESS ADJUSTMENT DEVICE, METHOD OF ADJUSTING BRIGHTNESS, AND PROGRAM

CROSS-REFERENCE TO RELATED APPLICATIONS

This application is a continuation of U.S. application Ser. No. 13/131,617, filed May 27, 2011, which is a National Stage of PCT/JP2009/070252, filed Dec. 2, 2009 and claims the benefit of priority under 35 U.S.C. §119 of Japanese Application No. 2008-316291, filed Dec. 30, 2009. The entire contents of each of which is incorporated herein by reference.

TECHNICAL FIELD

The present invention relates to a display device, a brightness adjustment device, a method of adjusting brightness, and a program.

BACKGROUND ART

Conventionally, as a flat thin display device, a liquid crystal display device using a liquid crystal, a plasma display device using plasma, and the like have been put into practical use.

The liquid crystal display device is a display device in which a backlight device is installed, and an image is displayed such that when a voltage is applied, an arrangement of liquid crystal molecules changes to pass or block light from the backlight. The plasma display device is a display device that displays an image such that a voltage is applied to a gas sealed in a substrate to create a plasma state, and ultraviolet light generated by energy generated when an original state is returned from the plasma state is irradiated to a phosphor and thus converted to visible light.

Meanwhile, in recent years, a light-emitting type display device using an organic electroluminescence (EL) device in which a device itself emits light when a voltage is applied has been developed. The organic EL device changes from a ground state to an excited state when energy is received by electrolysis and emits energy of a difference as light when the ground state is returned from the excited state. An organic EL display device displays an image using light emitted from the organic EL device.

Unlike the liquid crystal display device that requires the backlight, the light-emitting type display device does not require the backlight since the device emits light by itself. Thus, the light-emitting type display device can be configured thinner than the liquid crystal display device. Further, compared to the liquid crystal display device, the organic EL display device is excellent in a moving image characteristic, a viewing angle characteristic, color reproducibility, and the like and thus has attracted attention as a next generation flat thin display device.

In this circumstance, for example, as stated in the following Patent Literature 1, in a light-emitting type display device such as an organic EL display, a technique of reducing an electric current flowing through the panel to less than a maximum current and reducing peak brightness based on information of a video signal from a panel protection standpoint has been known.

CITATION LIST

Patent Literature

Patent Literature 1: Japanese Patent Application Laid-Open (JP-A) No. 2007-147868.

SUMMARY OF INVENTION

Technical Problem

In the above conventional technique, however, in order to reduce power consumption, a current value is reduced to less than a maximum current, and peak brightness is reduced. Therefore, although reducing power consumption is possible, it is difficult for a user to set flexibly according to situation, such as to adjust brightness in a case where movie is dark, to reduce only power consumption, or to keep brightness while reducing power to some extent, or the like. In addition, it was not possible to adjust balancing the power consumption and the peak brightness in accordance with brightness of a room.

Further, in a case where a system uses a surface light source such as a liquid crystal display, in order to reduce the power consumption, to brighten movie signals while reducing brightness of a backlight. However, in this case, information that the movie signals originally have, such as, texture, gloss, or contrast, or the like, would be lost.

The present invention is made in view of the above-mentioned issue, and aims to provide a display device, a brightness adjustment device, a method of adjusting brightness, and a program which are novel and improved, and which are capable of providing optimum movie in accordance with a situation by adjusting a peak brightness and power consumption independently.

Solution to Problem

According to an aspect of the present invention, in order to achieve the above-mentioned object, there is provided a display device including a setting condition acquisition unit for acquiring various conditions for adjusting a gain of a video signal, a table calculation unit that calculates a table representing a relationship between an average brightness and a gain of a video signal, and that calculates the table capable of setting a peak brightness and power consumption of the video signal independently, based on the various conditions acquired by the setting condition acquisition unit, an average brightness calculation unit that calculates an average brightness of a video signal input for each frame, a gain calculation unit that calculates a gain of a video signal from the table based on the average brightness calculated by the average brightness calculation unit, a video signal adjustment unit that adjusts a video signal using the gain calculated by the gain calculation unit, and a display panel that includes a plurality of pixels that emit light in response to a video signal and displays a video based on the video signal adjusted by the video signal adjustment unit.

According to the above configuration, various conditions for adjusting a gain of a video signal is acquired, based on the acquired various condition, a table representing a relationship between an average brightness and a gain of a video signal is calculated. This table is assumed to be a table being set with a peak brightness and power consumption of the video signal independently. The peak brightness of the video signal input for each frame is calculated, and the gain of the video signal is calculated from the table based on the calculated average brightness. The video signal is adjusted using the gain calculated by the gain calculation unit, and a video is to be displayed based on the adjusted video signal on a display panel included a plurality of pixels that emit light in response to a video signal. Since it becomes possible to control the peak brightness and power consumption independently in accordance with various conditions, the power consumption can be reduced in a state in which contrast feeling originally included in the video signal, a gloss of an object or a human skin, or the like is all maintained. Further, optimum video expression can be made according to the user's viewing environment. Thus, the video can be displayed at optimum brightness and power consumption according to the various conditions.

Further, the setting condition acquisition unit may acquire the various conditions including environmental information indicating an environment surrounding the display device, user setting information set by a user, information on maximum power consumption that the display panel allows, or information on meta data indicating a category of a video.

Further, it may further include a memory attached to a front stage of the video signal adjustment unit, the memory which holds temporarily a video signal of a frame by which a gain is multiplied.

Further, it may further include a chromaticity calculation unit for calculating chromaticity of a video signal based on the various conditions acquired by the setting condition acquisition unit, and a chromaticity adjustment unit for adjusting the chromaticity of the video signal using the chromaticity calculated by the chromaticity calculation unit.

According to another aspect of the present invention, in order to achieve the above-mentioned object, there is provided a brightness adjustment device including a setting condition acquisition unit for acquiring various conditions for adjusting a gain of a video signal, a table calculation unit that calculates a table representing a relationship between an average brightness and a gain of a video signal, and that calculates the table capable of setting a peak brightness and power consumption of the video signal independently, based on the various conditions acquired by the setting condition acquisition unit, an average brightness calculation unit that calculates an average brightness of a video signal input for each frame, a gain calculation unit that calculates a gain of a video signal from the table based on the average brightness calculated by the average brightness calculation unit, and a video signal adjustment unit that adjusts a video signal using the gain calculated by the gain calculation unit.

Further, the setting condition acquisition unit may acquire the various conditions including environmental information indicating an environment surrounding the display device, user setting information set by a user, information on maximum power consumption that the display panel allows, or information on meta data indicating a category of a video.

Further, it may further include a memory attached to a front stage of the video signal adjustment unit, the memory which holds temporarily a video signal of a frame by which a gain is multiplied.

Further, it may further include a chromaticity calculation unit for calculating chromaticity of a video signal based on the various conditions acquired by the setting condition acquisition unit, and a chromaticity adjustment unit for adjusting chromaticity of a video signal using the chromaticity calculated by the chromaticity calculation unit.

According to another aspect of the present invention, in order to achieve the above-mentioned object, there is provided a method of adjusting brightness including the steps of acquiring various conditions for adjusting a gain of a video signal, calculating a table representing a relationship between an average brightness and a gain of a video signal, and calculating the table capable of setting a peak brightness and power consumption of the video signal independently, based on the various conditions acquired by the setting condition acquisition unit, calculating an average brightness of a video signal input for each frame, calculating a gain of a video signal from the table based on the calculated average brightness, and adjusting a video signal using the gain calculated by the gain calculation unit.

According to another aspect of the present invention, in order to achieve the above-mentioned object, there is provided a program causing a computer to execute the steps of acquiring various conditions for adjusting a gain of a video signal, calculating a table representing a relationship between an average brightness and a gain of a video signal, and calculating the table capable of setting a peak brightness and power consumption of the video signal independently, based on the various conditions acquired by the setting condition acquisition unit, calculating an average brightness of a video signal input for each frame, calculating a gain of a video signal from the table based on the calculated average brightness, and adjusting a video signal using the gain calculated by the gain calculation unit.

Advantageous Effects of Invention

According to the present invention, it is possible to provide a display device, a brightness adjustment device, a method of adjusting brightness, and a program which are capable of providing optimum movie in accordance with a situation.

BRIEF DESCRIPTION OF DRAWINGS

FIG. 9 is a schematic diagram illustrating a configuration of a backlight device that includes a light source control unit and a surface light source.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted. Further, a description will be made in the following order.

1. Configuration of Display Device According to Embodiment of Present Invention
2. Example of Table Retained in Current-Brightness Control Table
3. Various Information for Setting Video Gain
4. Technique of Controlling Peak Brightness and Power Consumption 5. Example of Configuration of Current-Brightness Table Calculation Unit 6. Configuration for Adjusting chromaticity of Movie Signals 7. Process Procedure of Method of Adjusting Brightness 8. Application of Backlight Device.

[1. Configuration of Display Device According to Embodiment of Present Invention]

Figure 1:
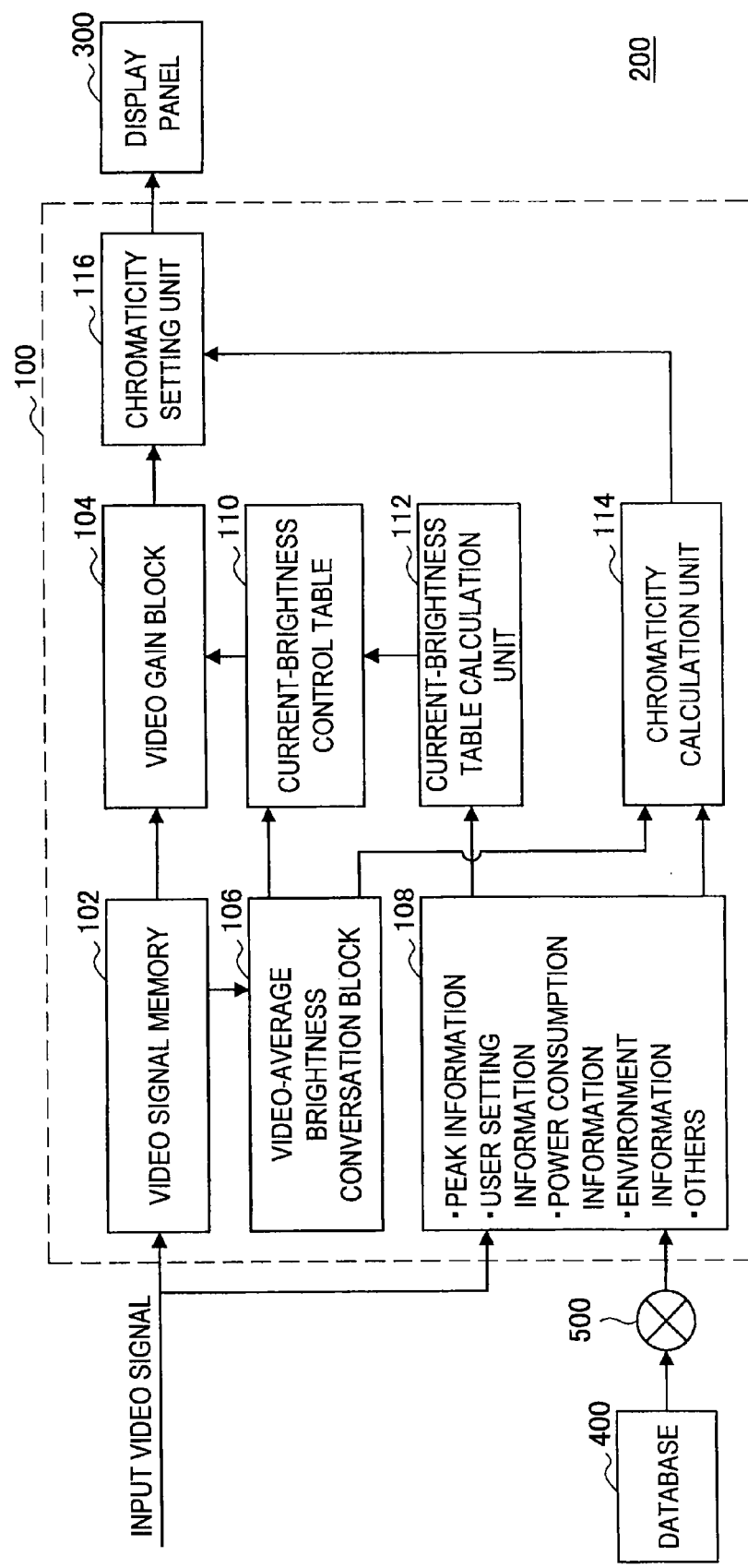
FIG. 1 is a schematic diagram illustrating a configuration of a display device according to an embodiment of the present invention.

FIG. 1 is a schematic diagram illustrating a configuration of a display device 200 according to an embodiment of the present invention. For example, the display device 200 is a device such as a television set and displays a television program based on a video signal obtained from a broadcast wave. The display device 200 includes a brightness adjustment device 100 and a display panel 300. The video signal is input to the brightness adjustment device 100 where brightness is adjusted and then transmitted to the display panel 300. The display panel 300 displays a video based on the adjusted video signal.

In the present embodiment, the display device 300 is configured with a light-emitting type panel. In the present embodiment, an organic EL panel is described as the display panel 300. The display panel 300 receives the video signal whose brightness is adjusted, causes an organic EL device that is an example of a light-emitting device to emit light in response to an input signal and pulse, and displays a moving image or a still image. A surface of the display panel 300 for displaying an image has a flat shape. The organic EL device is a light-emitting type device that emits light when a voltage is applied, and a light emission amount is in proportion to a voltage. Thus, an IL characteristic (a current-light emission amount characteristic) of the organic EL device also has a proportional relationship.

If the video signal is supplied, the display device 100 displays a video through the display panel 300 by lighting up pixels arranged inside the display panel 300 according to the video signal. In the display panel 300, a scan line for selecting a pixel at a predetermined scan period, a data line for providing brightness information for driving a pixel, and a pixel circuit for controlling a current amount based on the brightness information and causing the organic EL device, which is the light-emitting device, to emit light according to the current amount are arranged in the form of a matrix. The scan line, the data line, and the pixel circuit are configured as described above, and thus the display panel 300 can display the video according to the video signal.

As illustrated in FIG. 1, the brightness adjustment device 100 includes a video signal memory 102, a video gain block 104, a video-average brightness conversion block 106, and a setting condition acquisition unit 108. The setting condition acquisition unit 108 acquires a setting condition such as peak brightness (maximum value of brightness) information, power consumption information, environment information, or the like. The brightness adjustment device 100 further includes a current-brightness control table 110, a current-brightness table calculation unit 112, and a chromaticity calculation unit 114, and a chromaticity setting unit 116. Each of the functional blocks illustrated in FIG. 1 may be configured by hardware (a circuit) or an arithmetic processing unit (CPU) and software (a program) for causing it to function. When each functional block is configured by the arithmetic processing unit and the software, the program may be stored in a memory included in the display device 200 or a recording medium such as a memory inserted from the outside. For example, the setting condition acquisition unit 110 and the current-brightness table calculation unit 112 may be configured by the arithmetic processing unit and the software for causing it to function, and the other functional blocks may be configured by hardware.

The brightness adjustment device 100 receives the video signal for displaying the video on the display panel 300. Here, if it is assumed that the moving image is displayed on the display panel 300, the video signal is input for each frame of the moving image. The brightness adjustment device 100 performs brightness adjustment on the video signal of each frame through the video gain block 104, performs chromaticity adjustment in the chromaticity setting unit 116, and transmits the video signal done with these adjustments to the display panel 300.

Hereinafter, each of the functional blocks of the brightness adjustment device 100 illustrated in FIG. 1 will be described. The video signal memory 102 may be configured with a typical frame memory and temporarily store the video signal that is input for each frame. The video-average brightness conversion block 104 calculates an average brightness of each frame by averaging brightness of all pixels on the video signal of each frame. The calculated average brightness is transmitted to the current-brightness control table 110. The video signal is transmitted to the video gain block 104 for each frame.

The video-average brightness conversion block 104 calculates an electric current flowing through the display panel 300. In a device such as an organic EL panel or a light-emitting diode (LED) display, since an electric current and brightness are uniquely decided by a linear relationship, it is possible to easily calculate a consumption current based on brightness of the video signal stored in the video signal memory 102, a color difference signal, and R, G, and B signals.

The current-brightness control table 110 retains a table in which a relationship between an average brightness and a video gain is defined. The current-brightness control table 110 is a table for converting a gain amount by which the video signal is multiplied from an average brightness (an average video signal level) obtained from the video signal for controlling a maximum brightness or a current value based thereon. As will be described later, this table is created by the current-brightness table calculation unit 112 according to various conditions. The current-brightness control table 110 calculates the video gain based on the average brightness transmitted from the video-average brightness conversion block 104 or the current value by using the table. The calculated video gain is transmitted to the video gain block 104.

The video gain block 104 multiplies the corresponding video signal input from the video signal memory 102 by the video gain calculated by the current-brightness control table 110. As a result, the brightness of the video signal is optimally adjusted. As described above, in the present embodiment, by temporarily retaining the video signal in the video signal memory 102, a video signal of a certain frame can be adjusted using a video gain calculated based on an average brightness of the frame.

Further, in a case in which it is configured to adjust a video signal of the next or later frame using the calculated video gain, the video signal memory 102 may not be installed, and the input video signal can be input directly to the video gain block 104 and the video-brightness conversion block 106. In this case, it is preferable to have an overcurrent control function for protecting the display panel 300.

[2. Example of Table Retained in Current-Brightness Control Table]

Figure 2:
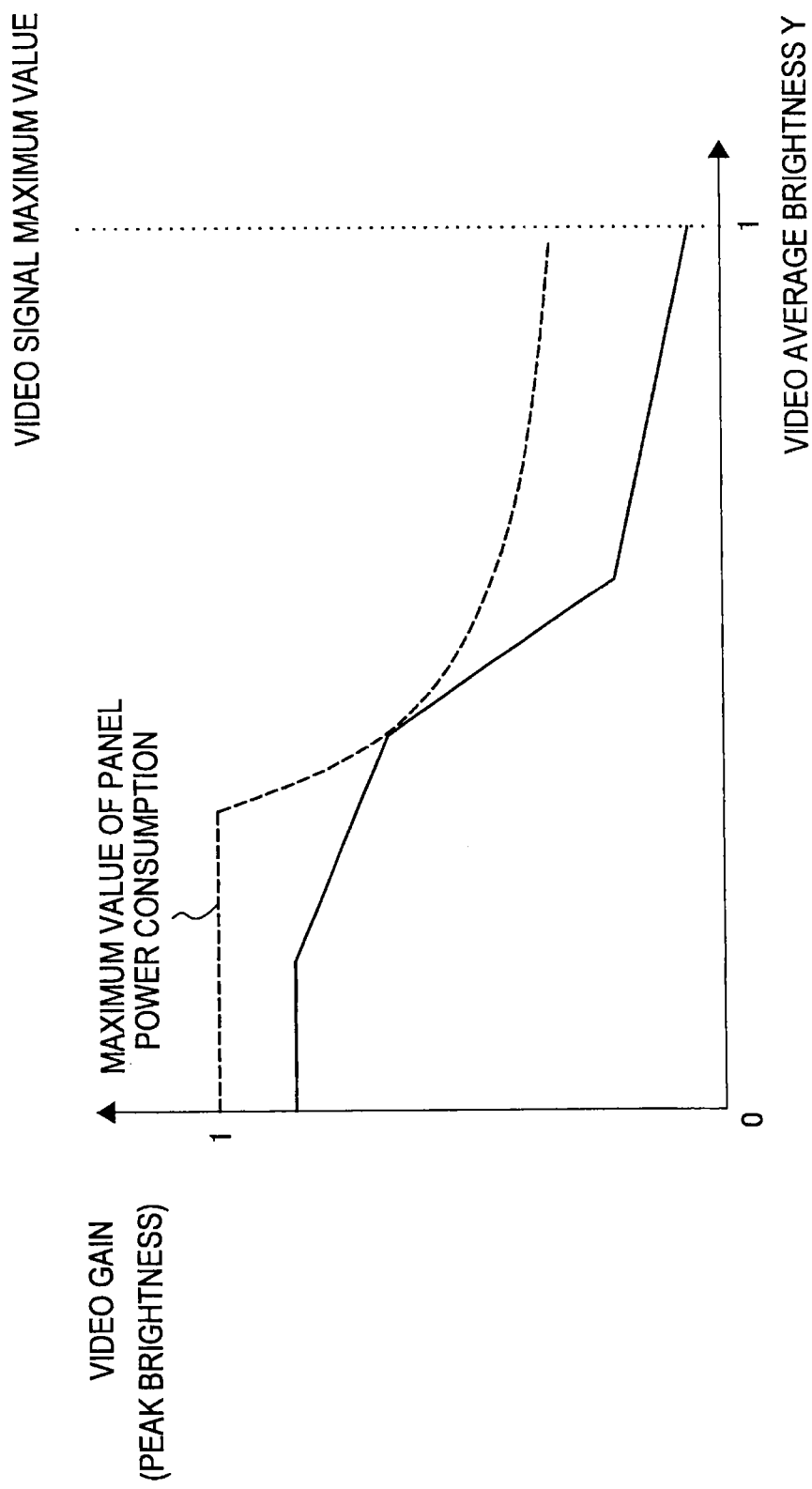
FIG. 2 is a characteristic diagram illustrating an example of a table retained in a current-brightness control table.

FIG. 2 is a characteristic diagram illustrating an example of a table retained in the current-brightness control table 110. A horizontal axis denotes an average brightness of a video, and a vertical axis denotes a video gain.

In FIG. 2, a characteristic indicated by a solid line represents a relationship between a video average brightness and a video gain created by the current-brightness table calculation unit 112 according to various conditions. This characteristic is basically set so that if an average brightness increases, a video gain decreases. Thus, when a video is bright and an average brightness is high, a video gain is set to a small value. Further, when a video is dark and an average brightness is low, a video gain is set to a large value.

In FIG. 2, a characteristic indicated by a dotted line represents a maximum value of power consumption of the display panel 300, and this characteristic is previously determined based on a characteristic of the display panel 300. By making the characteristic of the average brightness and the video gain indicated by the solid line equal to or less than the characteristic of the dotted line, the power consumption of the display panel 300 can be equal to or less than the maximum value, deterioration of the display panel 300 can be prevented, and power consumption can be reduced.

In the present embodiment, the characteristic of the solid line illustrated in FIG. 2 is rewritten at a predetermined time interval and set on a case-by-case basis, according to various conditions such as information of peak brightness (peak information), information set by the user, power consumption information, and environment information. The setting condition acquisition unit 108 has a function of acquiring the various conditions.

[3. Various Information for Setting Video Gain]

Hereinafter, the various information acquired by the setting condition acquisition unit 108 will be described. The information of peak brightness is a condition for setting a maximum brightness in the characteristic of the solid line in FIG. 2. The information of peak brightness is mainly decided by information set by the user (user-set information) and environment information (information such as the temperature, humidity, lightness, and color temperature of a place where the display device 200 is placed).

The user-set information is set by the user operating an operation button (not shown) of the display device 200 and includes information such as brightness of a video, a contrast, power consumption (a normal mode or a power save mode), and an image quality mode. The user can set the information to a desired value by operating the operation button.

For example, when the user performs setting for reducing brightness through the user-set information, the characteristic of the solid line of FIG. 2 is set by the current-brightness table calculation unit 112 so that the peak brightness can decrease. In this case, the characteristic of the solid line of FIG. 2 changes so that the maximum value of the video gain can further decrease.

The display device 200 may include a temperature sensor, a humidity sensor, a brightness sensor, a color difference sensor, or the like for acquiring the environment information, and the environment information may be acquired from the sensors. Alternatively, the environment information may be acquired from a predetermined database 400. In this case, the database 400 and the brightness adjustment device 100 may be connected via a network such as the Internet 500.

For example, when it is judged by the brightness sensor that external light of a place where the display device 200 is placed is bright, the current-brightness table calculation unit 112 sets the characteristic of the solid line of FIG. 2 so that the peak brightness can further increase. As a result, even in a bright room, a video that is easy for a viewer to watch can be displayed on the display panel 300.

The video signal is also input to the setting condition acquisition unit 108. When it is judged, based on an average value of the video signal or the like, that the brightness of the video is high, the current-brightness table calculation unit 112 sets the characteristic of the solid line of FIG. 2 so that the peak brightness can decrease. As a result, it is possible to prevent the viewer from experiencing glare.

The power consumption information is information corresponding to the characteristic of the dotted line of FIG. 2 and is previously decided according to a characteristic of the display panel 300. The current-brightness table calculation unit 112 sets the characteristic of the average brightness and the video gain indicated by the solid to be equal to or less than the characteristic of the dotted line. As a result, panel power consumption can be prevented from exceeding an allowable range, and deterioration of the display panel can be suppressed. Further, it is possible to minimize power consumption of the display device 200. If the characteristic indicated by the solid line exceeds the characteristic of the dotted line, the current-brightness table calculation unit 112 sets the characteristic of the solid line to overlap with the characteristic of the dotted line on the exceeded portion. As a result, it is possible to reliably prevent the power consumption from exceeding the allowable range.

The setting condition acquisition unit 108 acquires various metadata as the other information. For example, the metadata is information acquired from the video signal and includes information such as a genre of a video (a news program, a drama, a movie, etc.), a title of a video, and a current weather (when a video is a weather forecast). The various metadata may be acquired from the database 400.

When it is detected, based on the metadata acquired from the video signal or the database 400, that a video is a variety program, the current-brightness table calculation unit 112 sets the characteristic so that the peak brightness can decrease. As a result, when a program having a relatively high average brightness such as a variety program is broadcast, it is possible to prevent the viewer from experiencing excessive glare. For example, even when a video of a starry sky is displayed, a video of a clearer starry sky can be provided by increasing the peak brightness.

The current-brightness table calculation unit 112 performs a calculation based on the various setting conditions acquired by the setting condition acquisition unit 108 and sets the characteristic indicated by the solid line of FIG. 2. For example, when it is detected by the sensor for acquiring the above described environment information that external light brightness of a place where the display device 200 is placed is high, the characteristic of the solid line of FIG. 2 is set so that the peak brightness can further increase. In a case in which setting of reducing power consumption is performed, for example, when the user sets an energy save mode, the characteristic of the solid line of FIG. 2 is set so that power consumption can further decrease.

[4. Technique of Controlling Peak Brightness and Power Consumption]

Figure 3:
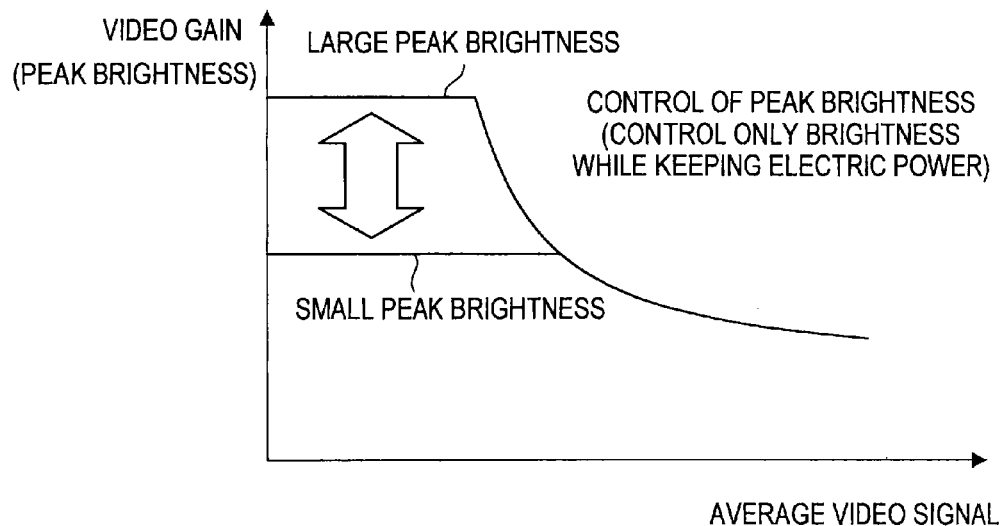
FIG. 3 is a schematic diagram illustrating a technique of controlling a peak brightness and power consumption, respectively, in a characteristic of a solid line of FIG. 2.
Figure 4:
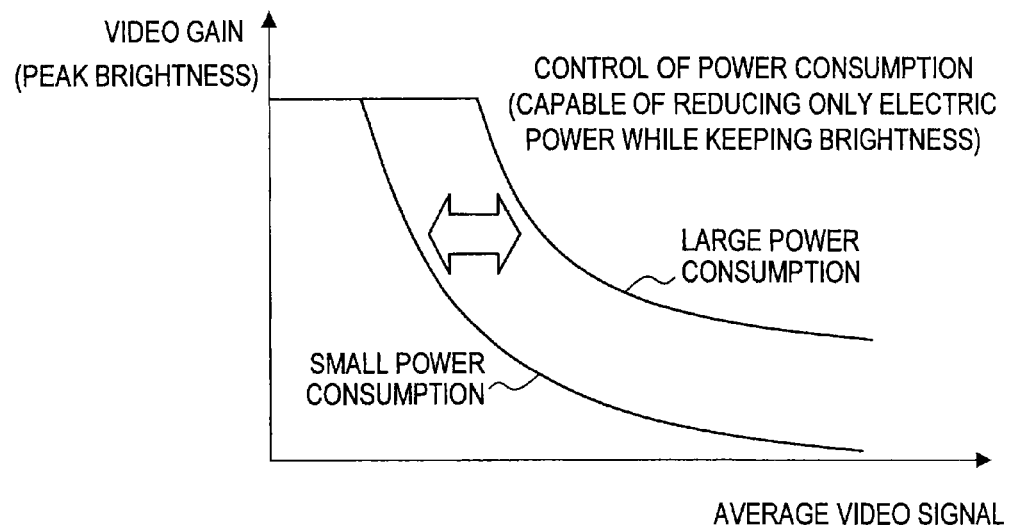
FIG. 4 is a schematic diagram illustrating a technique of controlling a peak brightness and power consumption, respectively, in a characteristic of a solid line of FIG. 2.

FIGS. 3 and 4 are schematic diagrams illustrating a technique of controlling the peak brightness and the power consumption, respectively, in the characteristic of the solid line of FIG. 2. FIG. 3 illustrates a technique of controlling the peak brightness, and FIG. 4 illustrates a technique of controlling the power consumption.

As illustrated in FIG. 3, in the case of controlling the peak brightness, only the peak brightness is controlled by changing the characteristic in a direction indicated by an arrow of FIG. 3 in a state in which the power consumption is kept. Meanwhile, as illustrated in FIG. 4, in the case of controlling the power consumption, only power consumption is controlled by changing the characteristic in a direction indicated by an arrow of FIG. 4 in a state in which the peak brightness is kept. By controlling the peak brightness and the power consumption through the techniques illustrated in FIGS. 3 and 4 as described above, the peak brightness and the power consumption can be individually controlled.

Thus, according to the present embodiment, by individually controlling the peak brightness and the power consumption in a range that does not exceed the characteristic of the dotted line of FIG. 2, the brightness of the video signal can optimally be adjusted in a range equal to or less than maximum power consumption allowed by the display panel 300.

The calculation by the current-brightness table calculation unit 112 is performed, for example, at an interval of 200 [ms] to 1 [s], and the characteristic of the table indicated by the solid line of FIG. 2 is rewritten on a case-by-case basis. The characteristic may be rewritten for each frame.

[5. Example of Configuration of Current-Brightness Table Calculation Unit]

Figure 5:
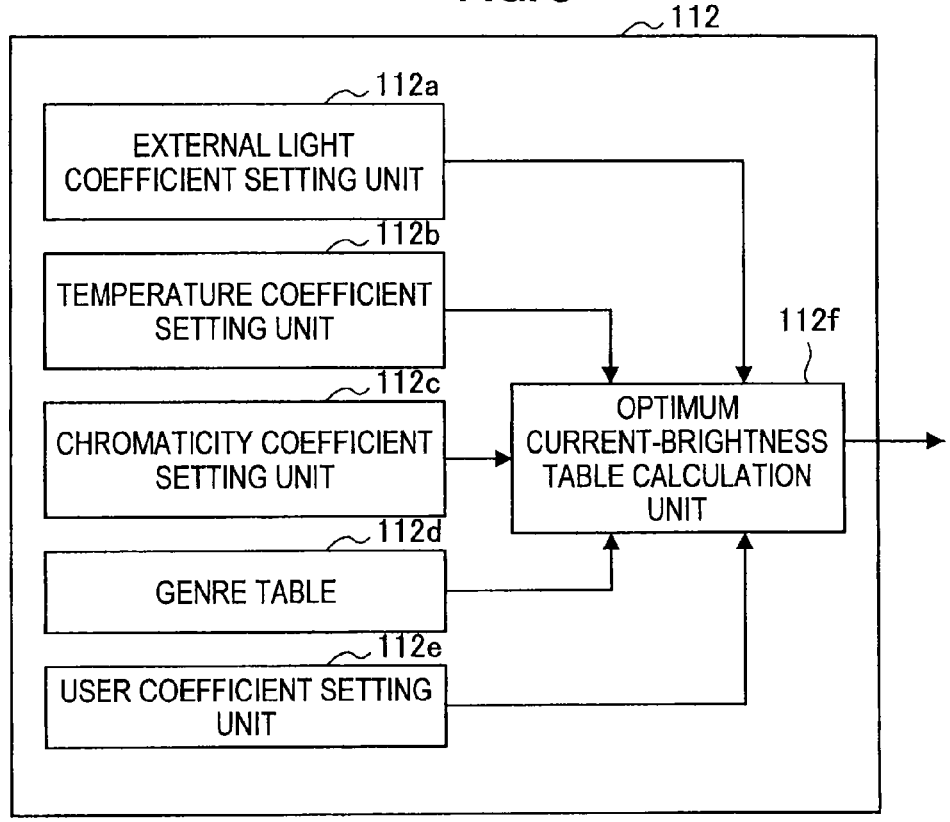
FIG. 5 is a schematic diagram illustrating an example of a configuration of a current-brightness table calculation unit.

FIG. 5 is a schematic diagram illustrating an example of a configuration of the current-brightness table calculation unit 112. As illustrated in FIG. 5, the current-brightness table calculation unit 112 includes an external light coefficient setting unit 112a, a temperature coefficient setting unit 112b, a chromaticity coefficient setting unit 112c, a genre table 112d, a user coefficient setting unit 112e, and a current-brightness table calculation unit 112f. The external light coefficient setting unit 112a sets a coefficient based on brightness of external light input as the environment information. The temperature coefficient setting unit 112b sets a coefficient based on the temperature input as the environment information. The chromaticity coefficient setting unit 112c sets a coefficient based on chromaticity input as the environment information. The genre table 112d sets a coefficient based on a genre of a video input as metadata. The user coefficient setting unit 112e sets a coefficient based on a setting value set by the user.

The current-brightness table calculation unit 112f calculates the characteristic of the solid line illustrated in FIG. 2 based on the coefficients set by the external light coefficient setting unit 112a, the temperature coefficient setting unit 112b, the chromaticity coefficient setting unit 112c, the genre table 112d, and the user coefficient setting unit 112e.

As described above, according to the brightness adjustment device 100 of the present embodiment, it is possible to individually control the peak brightness and the power consumption in the current-brightness adjustment table according to the various conditions. As a result, the power consumption can be reduced in a state in which contrast feeling originally included in the video signal, a gloss of an object or a human skin, or the like is all maintained. Further, optimum video expression can be made according to the user's viewing environment. Thus, the video can be displayed at optimum brightness and power consumption according to the various conditions.

[6. Operation of Flash Control Calculation Unit]

Next, in the brightness adjustment device 100, the chromaticity calculation unit 114 and the chromaticity setting unit will be described. The chromaticity calculation unit calculates an optimal chromaticity for movie signals in each frame in accordance with each setting condition acquired in the setting condition acquisition unit 108, and sends them to the chromaticity setting unit 116. The chromaticity setting unit 116 sets chromaticity of the movie signals based on the chromaticity calculated in the chromaticity calculation unit 114. The movie signals set with chromaticity in the chromaticity setting unit 116 are sent to the display panel 300. Here, chromaticity is a concept including color temperature, and the chromaticity setting unit 116 also adjusts tone of R, G, B as well as adjusting the color temperature of movie data.

Figure 6:
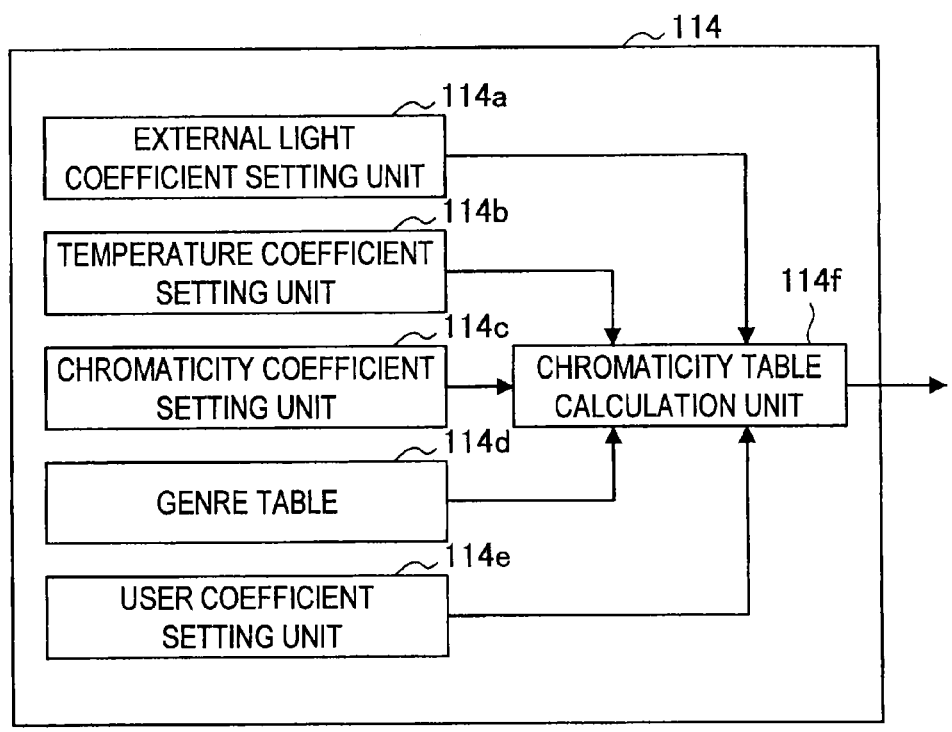
FIG. 6 is a schematic diagram illustrating a specific configuration of a chromaticity calculation unit.

FIG. 6 is a schematic diagram illustrating a specific configuration of the chromaticity calculation unit 114. As illustrated in FIG. 6, the chromaticity calculation unit 114 includes an external light coefficient setting unit 114a, a temperature coefficient setting unit 114b, a chromaticity coefficient setting unit 114c, a genre table 114d, a user coefficient setting unit 114e, and a chromaticity calculation unit 114f. The external light coefficient setting unit 114a sets a coefficient of chromaticity based on brightness of external light input as the environment information. The temperature coefficient setting unit 114b sets a coefficient based on the temperature input as the environment information. The chromaticity coefficient setting unit 114c sets a coefficient based on chromaticity input as the environment information. The genre table 114d sets a coefficient based on a genre of a video input as metadata. The user setting unit 114e sets a coefficient based on a genre of a video input as metadata. The user coefficient setting unit 112e sets a coefficient based on a setting value set by the user.

The chromaticity calculation unit 114f calculates optimal chromaticity based on the coefficients set by the external light coefficient setting unit 114a, the temperature coefficient setting unit 114b, the chromaticity coefficient setting unit 114c, the genre table 114d, and the user coefficient setting unit 114e.

As described above, according to the brightness adjustment device 100 of the present embodiment, it becomes possible to adjust chromaticity of video signal optically for each frame based on various conditions, such as a user setting, environmental condition, or the like. Accordingly, it is possible to display optimal video according to various conditions by controlling peak brightness and power consumption respectively as well as controlling chromaticity optimally.

[7. Process Procedure of Method of Adjusting Brightness]

Figure 7:
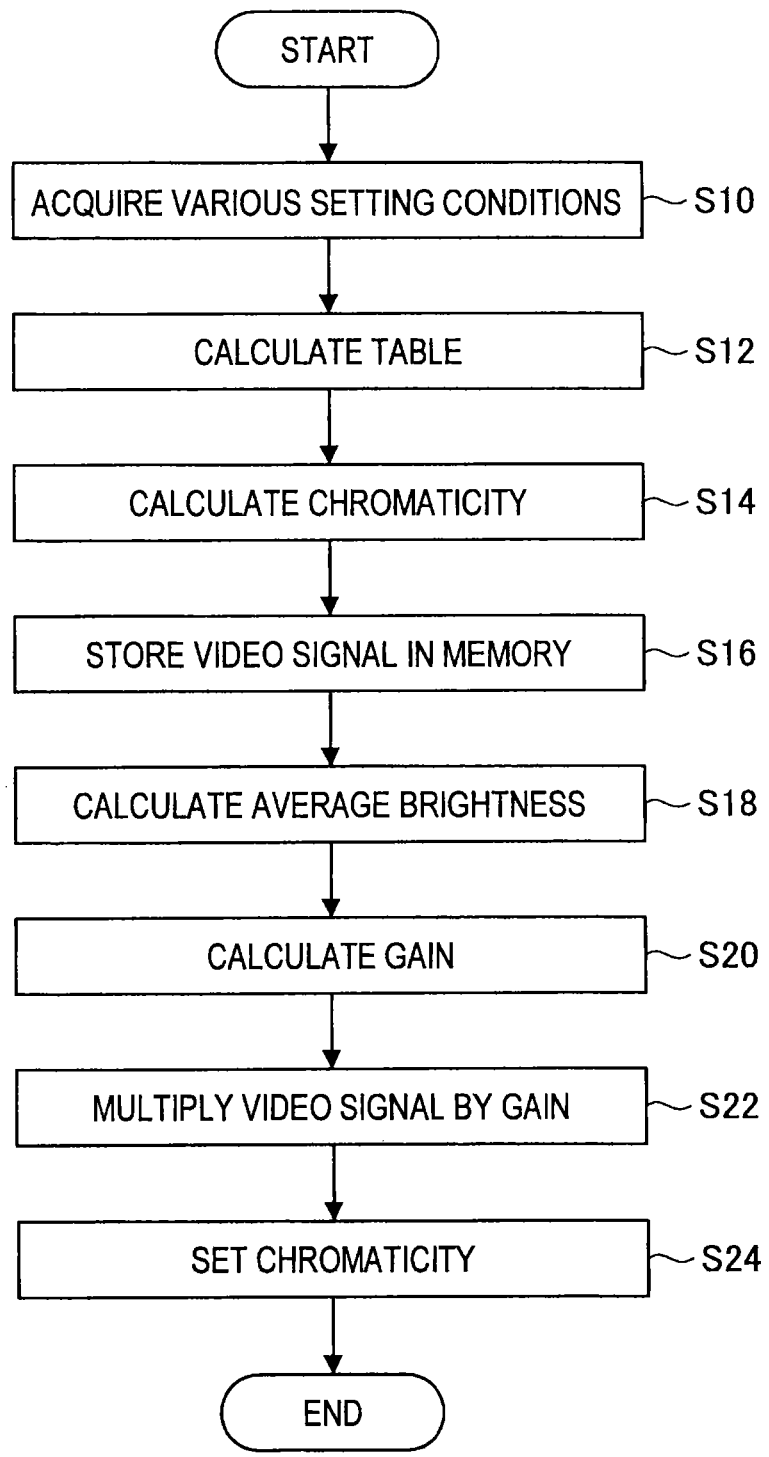
FIG. 7 is a flowchart illustrating a process performed by a brightness adjustment device.

Next, a process performed by the brightness adjustment device 100 will be described. FIG. 7 is a flowchart illustrating a process performed by the brightness adjustment device 100. First, in step S10, the setting condition acquisition unit 108 acquires various setting conditions. In subsequent step S12, the current-brightness control table 110 individually sets the peak brightness and the power consumption based on the various setting conditions and calculates the table illustrated in FIG. 2. The calculated table is to be stored as the current-brightness control table 110.

In subsequent step S14, chromaticity of video signal is calculated based on various setting conditions by the chromaticity calculation unit 114. In subsequent step S16, the video frame of each frame is stored in the video signal memory 102. In subsequent step S18, the video-average brightness conversion block 104 calculates the average brightness of each frame by averaging brightness of all pixels of the video signal of each frame stored in the video signal memory 102.

In subsequent step S20, the average brightness calculated in step S18 is input to the current-brightness control table 110, and the video gain is calculated from the average brightness. In subsequent step S22, the video signal of each frame stored in the video signal memory 102 is transmitted to the video gain block 104 and multiplied by the video gain calculated in step S20. In subsequent step S24, the video signal multiplied by the video gain is sent to the chromaticity setting unit 116, and chromaticity of the video signal is set to chromaticity calculated in step S14.

The above described process may be performed by recording a computer program previously created to execute a corresponding process in a recording medium inside the display device and causing an arithmetic device (for example, a CPU) to sequentially read and execute the corresponding computer program.

[8. Application of Backlight Device]

Figure 8:
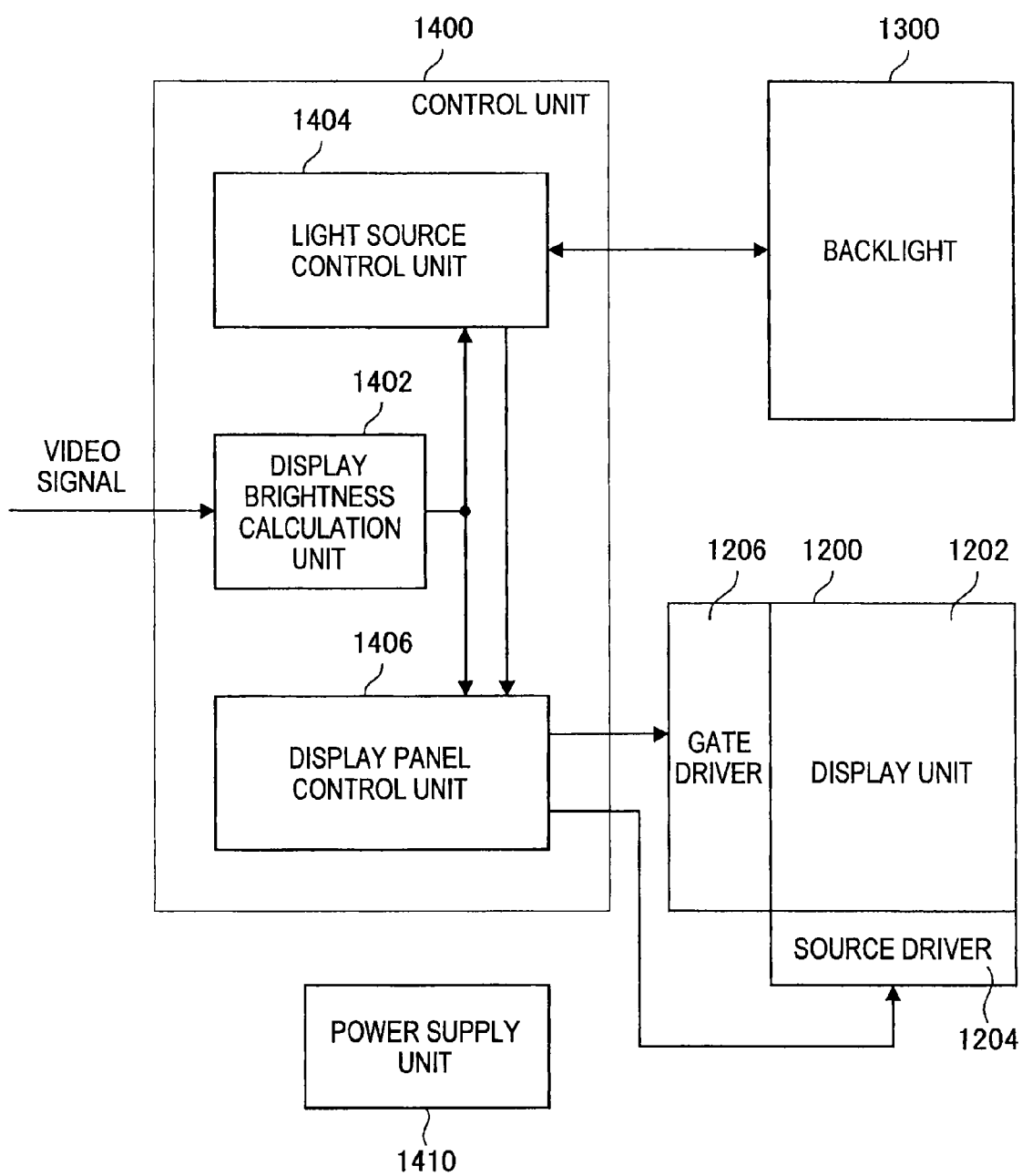
FIG. 8 is a functional block diagram illustrating a configuration of a display device including a backlight device.

Next, an embodiment in which the present invention is applied to a backlight device will be described. The above described example has been described in connection with the brightness adjustment device 100 of the display device 200 including the organic EL panel that is configured to individually control the peak brightness and the power consumption. However, a backlight device used in a liquid crystal display device or the like may be configured by a similar configuration. FIG. 8 is a functional block diagram illustrating a configuration of a display device 1000 including a backlight device. In FIG. 8, the backlight device 1000 is configured with a liquid crystal display device.

As illustrated in FIG. 8, the display device 1000 includes a display panel 1200 that includes a color filter substrate, a liquid crystal layer, and the like, a surface light source 1300 disposed on a back side of the display panel 1200, a control unit 1400 that controls the display panel 1200 and the surface light source 1300, and a power supply unit 1410. The control unit 1400 and the power supply unit 1410 may be configured integrally with the display device 1100 or may be configured separately from the display device 1100.

The display device 1100 displays an original image corresponding to an image signal on a predetermined display area (an area corresponding to a display unit 1202 of the display panel 1200). For example, an input image signal input to the display device 1100 corresponds to an image (a frame image) of a frame rate of 60 Hz.

The display panel 1200 includes the display unit 1202 in which a plurality of opening sections through which white light from the surface light source 1300 is passed are arranged. The display panel 1200 includes a source driver 1204 and a gate driver 1206 that transmit a driving signal to transistors (thin film transistors (TFTs) disposed in the opening sections of the display unit 1202.

The white light that has passed through the opening sections of the display unit 1202 is converted to red, green, or blue light by a color filter formed on the color filter substrate (not shown). A set including three opening sections that emit red, green, and blue light corresponds to one pixel of the display unit 1202.

The surface light source 1300 emits the white light in a light-emitting area corresponding to the display unit 1202. The light-emitting area of the surface light source 1300 is divided into a plurality of blocks (areas), and light emission is controlled individually on each of the plurality of divided blocks.

The control unit 1400 includes a display brightness calculation unit 1402, a light source control unit 1404, and a display panel control unit 1406. An image signal corresponding to each frame image is supplied to the display brightness calculation unit 1402. The display brightness calculation unit 1402 obtains a brightness distribution of a frame image from the supplied image signal and calculates display brightness necessary for each block from the brightness distribution of the frame image. The calculated display brightness is supplied to the light source control unit 1404 and the display panel control unit 1406.

The light source control unit 1404 calculates backlight brightness in each block of the surface light source 1300 based on the display brightness of each block supplied from the display brightness calculation unit 402. The light source control unit 1404 controls a light emission amount of a light-emitting diode (LED) 1330 of each block in order to satisfy the calculated backlight brightness through pulse width modulation (PWM) control. Since the light-emitting brightness of the surface light source 1300 can be controlled for each block according to the input image signal as described above, optimal light emission according to an image displayed on the display panel 1200 can be performed. In some cases, controlling the light emitting brightness of the surface light source 1300 for each block according to the input image signal is called divided light-emitting driving or partial light-emitting driving.

The light source control unit 1404 performs light-emitting control for performing correction of light-emitting brightness or chromaticity based on light-emitting brightness or chromaticity of each block detected by a sensor disposed inside the backlight 1300. Here, the sensor includes an illuminance sensor, a color sensor, or the like.

The backlight brightness of each block of the surface light source 1300 calculated by the light source control unit 1404 is supplied to the display panel control unit 1406. The display panel control unit 1406 calculates a liquid crystal aperture ratio of each pixel of the display unit 1202 based on the display brightness of each block supplied from the display brightness calculation unit 1402 and the backlight brightness of each block supplied from the light source control unit 1404. In order to satisfy the calculated light crystal aperture ratio, the display panel control unit 1406 supplies a driving signal to the source driver 1204 and the gate driver 1206 of the display panel 200 and driving-controls the TFT of each pixel of the display unit 202. The power supply unit 1410 supplies each part of the display device 100 with predetermined electric power.

FIG. 9 is a schematic diagram illustrating a configuration of a backlight device 1500 that includes the light source control unit 1404 and the surface light source 1300. The light source control unit 1404 has a configuration similar to the brightness control device 100 that has been described with reference to FIG. 1. That is, the light source control unit 1404 includes a memory 102, a gain block 104, an average brightness conversion block 106, and a setting condition acquisition unit 108. The brightness adjustment device 100 further includes a current-brightness control table 110. Each of the functional blocks illustrated in FIG. 9 may be configured by hardware (a circuit) or an arithmetic processing unit (CPU) and software (a program) for causing it to function. When each functional block is configured by the arithmetic processing unit and the software, the program may be stored in a memory included in the display device 200 or a recording medium such as a memory inserted from the outside.

The backlight brightness in each block of the surface light source 1300, which is calculated by the light source control unit 140, is input to the memory 102. The video-average brightness conversion block 104 calculates an average brightness of each frame by averaging brightness of each block on a brightness signal of each frame. The calculated average brightness is transmitted to the current-brightness control table 110. The brightness signal is transmitted to the video gain block 104 for each frame.

The current-brightness control table 110 retains a table in which a relationship between an average brightness and a gain is defined. The current-brightness control table 110 is a table for converting a gain amount by which the video signal is multiplied from an average brightness (an average video signal level) obtained from the video signal for controlling a maximum brightness or a current value based thereon. This table is created by the current-brightness table calculation unit 112 according to various conditions.

The current-brightness control table 110 calculates the video gain based on the average brightness transmitted from the video-average brightness conversion block 104 using the created table. The calculated video gain is transmitted to the video gain block 104.

The gain block 104 multiplies the corresponding brightness signal input from the memory 102 by the gain calculated by the current-brightness control table 110. As a result, the brightness of the surface light source 1300 is optimally adjusted.

As described above, in the backlight device 1500, such as a liquid crystal display device or the like, when the gain is adjusted based on the brightness signal, it is possible to control peak brightness and power consumption respectively.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

INDUSTRIAL APPLICABILITY

The present invention can broadly be applied, for example, to a display device used in a television receiver or the like.

REFERENCE SIGNS LIST

100 Brightness adjustment device
104 Video gain block
106 Video-average brightness conversion block
108 Setting condition acquisition unit
110 Current-brightness control table
112 Current-brightness table calculation unit
114 Flash control calculation unit
200 Display device
300 Display panel

The invention claimed is:

1. A display device, comprising:
 circuitry configured to
  acquire various conditions for adjusting a gain of a video signal;
  calculate a table representing a relationship between an average brightness and the gain of the video signal, and calculate the table capable of setting a peak brightness and power consumption of the video signal independently, based on the various conditions;
  calculate an average brightness of the video signal for each frame;
  a calculate the gain of the video signal from the table based on the average brightness; and
  adjust the video signal using the calculated gain; and
 a display panel that includes a plurality of pixels that emit light in response to the video signal and displays a video based on the video signal adjusted by the circuitry.

2. The display device according to claim 1, wherein the circuitry is configured to acquire the various conditions including environmental information indicating an environment surrounding the display device, user setting information set by a user, information on maximum power consumption that the display panel allows, or information on meta data indicating a category of the video.

3. The display device according to claim 1, wherein the circuitry comprises
 a memory which holds temporarily a frame by which the gain is multiplied.

4. The display device according to claim 1, wherein the circuitry is further configured to:
 calculate chromaticity of the video signal based on the various conditions; and
 adjust the chromaticity of the video signal using the chromaticity calculated by the circuitry.

5. A brightness adjustment device, comprising:
 circuitry configured to
  acquire various conditions for adjusting a gain of a video signal;
  calculate a table representing a relationship between an average brightness and the gain of the video signal, and calculate the table capable of setting a peak brightness and power consumption of the video signal independently, based on the various conditions;
  calculate an average brightness of the video signal input for each frame;
  calculate the gain of the video signal from the table based on the average; and
  adjust the video signal using the calculated gain.

6. The brightness adjustment device according to claim 5, wherein the circuitry is configured to acquire the various conditions including environmental information indicating an environment surrounding the display device, user setting information set by a user, information on maximum power consumption that a display panel allows, or information on meta data indicating a category of a video.

7. The brightness adjustment device according to claim 5, wherein the circuitry comprises
 a memory which holds temporarily a frame by which the gain is multiplied.

8. The brightness adjustment device according to claim 5, wherein the circuitry is further configured to:
 calculate chromaticity of the video signal based on the various conditions; and
 adjust chromaticity of the video signal using the chromaticity calculated by the circuitry.

9. A method of adjusting brightness, comprising the steps of:
 acquiring various conditions for adjusting a gain of a video signal;
 calculating a table representing a relationship between an average brightness and the gain of the video signal, and calculating the table capable of setting a peak brightness and power consumption of the video signal independently, based on the various conditions;
 calculating an average brightness of the video signal for each frame;
 calculating the gain of a video signal from the table based on the calculated average brightness; and
 adjusting the video signal using the calculated gain.

10. A non-transitory computer-readable medium storing instructions that, when executed on a computer, cause the computer to execute the steps of:
 acquiring various conditions for adjusting a gain of a video signal;
 calculating a table representing a relationship between an average brightness and the gain of the video signal, and calculating the table capable of setting a peak brightness and power consumption of the video signal independently, based on the various conditions;
 calculating an average brightness of the video signal input for each frame;

calculating the gain of the video signal from the table based on the calculated average brightness; and
adjusting the video signal using the calculated gain.

\* \* \* \* \*